(12) United States Patent
Kimura et al.

(10) Patent No.: US 7,164,218 B2
(45) Date of Patent: Jan. 16, 2007

(54) ELECTRIC MOTOR AND ELECTRIC TYPE COMPRESSOR

(75) Inventors: Kazuya Kimura, Kariya (JP); Hiroyuki Gennami, Kariya (JP); Kazuhiro Kuroki, Kariya (JP); Ken Suitou, Kariya (JP); Yoshikazu Fukutani, Kariya (JP)

(73) Assignee: Kabushiki Kaisha Toyota Jidoshokki, Aichi Ken (JP)

( * ) Notice: Subject to any disclaimer, the term of this patent is extended or adjusted under 35 U.S.C. 154(b) by 103 days.

(21) Appl. No.: 10/624,854

(22) Filed: Jul. 22, 2003

(65) Prior Publication Data
US 2004/0124731 A1 Jul. 1, 2004

(30) Foreign Application Priority Data
Jul. 23, 2002 (JP) .......................... P2002-213934
Jul. 1, 2003 (JP) .......................... P2002-189687

(51) Int. Cl.
*H02K 5/12* (2006.01)
*F04C 29/00* (2006.01)

(52) U.S. Cl. .................. 310/216; 310/89; 310/58; 310/217; 417/423.7; 417/423.14; 417/423.8

(58) Field of Classification Search ............. 29/596; 310/258, 156.27, 179, 216, 254, 259, 52, 310/58, 59, 64, 217, 218, 89; 417/410.1, 417/423.7, 368, 423.14, 423.8

See application file for complete search history.

(56) References Cited

U.S. PATENT DOCUMENTS

| | | | | |
|---|---|---|---|---|
| 4,250,423 A * | 2/1981 | Linscott, Jr. | .............. | 310/258 |
| 4,888,510 A * | 12/1989 | Hunt | .................. | 310/54 |
| 5,218,252 A * | 6/1993 | Iseman et al. | ............... | 310/64 |
| 5,331,238 A * | 7/1994 | Johnsen | ................ | 310/58 |
| 5,998,904 A * | 12/1999 | Hattori | ................ | 310/216 |
| 6,000,917 A * | 12/1999 | Smerud et al. | ............. | 417/368 |
| 6,472,780 B1 * | 10/2002 | Kikuchi et al. | .............. | 310/52 |
| 6,836,045 B1 * | 12/2004 | Murakami et al. | ...... | 310/156.53 |
| 6,836,051 B1 * | 12/2004 | Hiwaki et al. | ............. | 310/258 |
| 2004/0124731 A1 * | 7/2004 | Kimura et al. | ............. | 310/216 |

(Continued)

FOREIGN PATENT DOCUMENTS

DE 740531 10/1943

(Continued)

*Primary Examiner*—Karl Tamai
(74) *Attorney, Agent, or Firm*—Knoble Yoshida & Dunleavy, LLC (57) ABSTRACT

An electric motor includes a housing and a circular stator. The housing has an inner circumferential surface. The housing also has a first predetermined thermal expansion coefficient. The housing further has an elastic part. The stator core is pressed to an inside of the housing by tight fit. The stator core has an outer circumferential surface. The stator core also has a second predetermined thermal expansion coefficient that is different from the first predetermined thermal expansion coefficient. A void is defined between the inner circumferential surface and the outer circumferential surface so as to prevent the inner and the outer circumferential surfaces from contacting each other in a circular region. When the housing and the stator core expand or shrink so as to tightly fit each other due to a differential between the first and second predetermined thermal expansion coefficients, the elastic part corresponding to the void is elastically deformed.

15 Claims, 6 Drawing Sheets

U.S. PATENT DOCUMENTS

2005/0115055 A1* 6/2005 Kimura et al. ................ 29/596

FOREIGN PATENT DOCUMENTS

DE 2042239 3/1972
DE 19960088 3/2001
JP 57-129287 * 8/1982 ................ 417/357
WO 02/31947 * 4/2002

* cited by examiner

ELECTRIC MOTOR AND ELECTRIC TYPE COMPRESSOR

BACKGROUND OF THE INVENTION

The present invention relates to an electric motor and to an electric type compressor, which is formed by integrating the electric motor with a compression mechanism.

Japanese Unexamined Patent Publication No. 2003-56463 discloses electric type compressors, which are integrally provided with an electric motor, and are used in a vehicle air conditioning apparatus. In the electric type compressor, a circular stator core for the electric motor is tightly fitted inside of a cylindrical housing by shrink fit and press fit. Since the fixation of the stator core by the tight fit is relatively simple and easy, the associated cost of the electric type compressor is lowered.

However, if an aluminum housing is used to reduce the weight of the electric type compressor, since the thermal expansion coefficient of the housing is different from that of the stator core made of iron, a degree of tightness between the stator core and the housing changes in accordance with a temperature change of the electric type compressor. Note that thermal expansion coefficient of aluminum is larger than that of iron. The interference between the housing and the stator core is predetermined in such a manner that the housing and the stator core are not loose with each other even when the temperature of the electric type compressor becomes relatively high. Therefore, on the contrary, when the temperature of the electric type compressor becomes relatively low, the degree of tightness is excessively increased and the housing and/or the stator core generate a crack.

SUMMARY OF THE INVENTION

The present invention is directed to an electric type compressor motor including a housing having an inner circumferential surface, the housing also having a first thermal expansion coefficient, the housing further having an elastic part and having a plurality of recesses which are formed near the elastic part extending outwardly in the radial direction of the inner circumferential surface to define corresponding voids; an electric motor including a circular stator core pressed to an inside of the housing by tight fit, the stator core having an outer circumferential surface and a central axis, the stator core also having a second thermal expansion coefficient that is different from the first thermal expansion coefficient; a compressor mechanism accommodated in the housing and connected to the electric motor for compressing gas as driven by the electric motor; wherein voids are defined between the inner circumferential surface outside the recesses of the housing and the outer circumferential surface of the stator core so as to prevent the inner and the outer circumferential surfaces from contacting each other in a circular region, wherein the first voids and the second voids extend substantially along the length of the stator core in the direction of the central axis of the stator core and wherein one of the first voids and corresponding one of the second voids define a void, wherein the elastic part of the housing is located near each of the first voids, and wherein the elastic part of the housing is elastically deformed when the housing and the stator core expand or shrink so as to tightly fit each other due to a differential between the first and the second thermal expansion coefficients

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
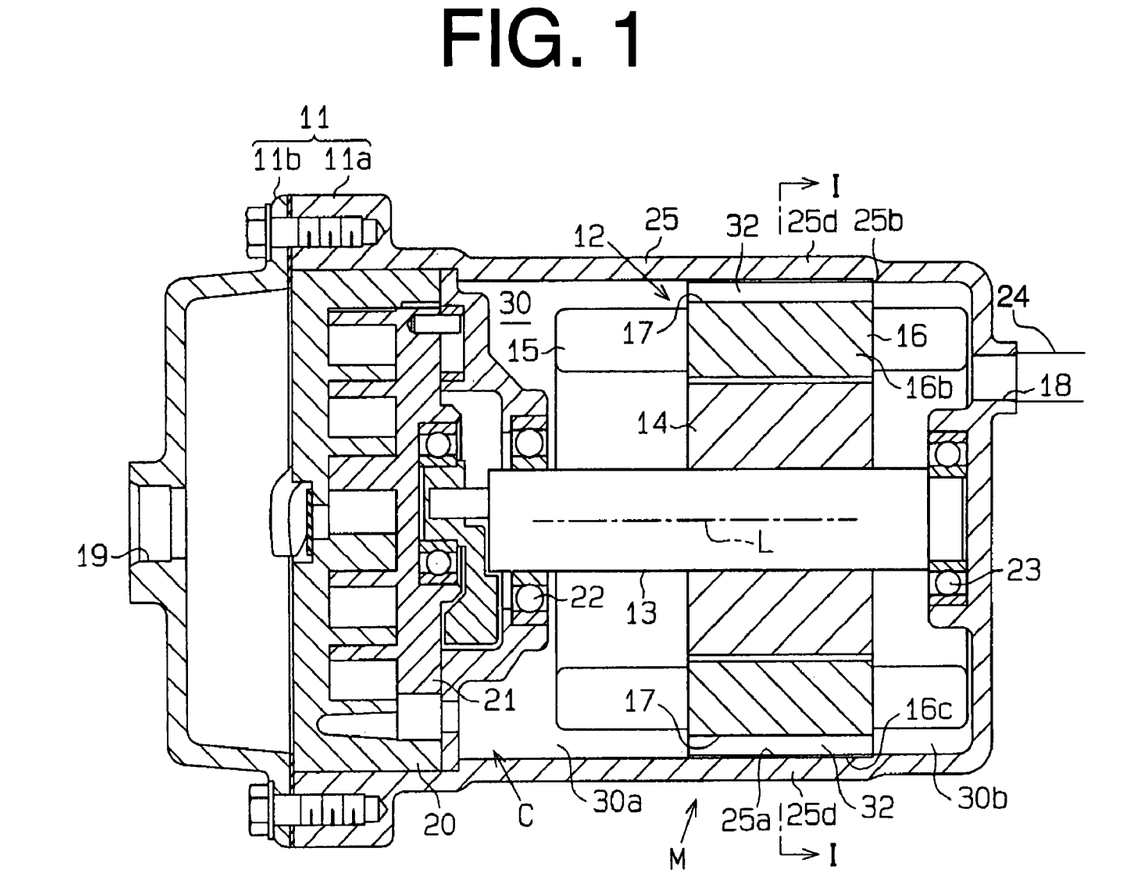
FIG. 1 is a longitudinal cross sectional view illustrating an electric type compressor according to a first preferred embodiment of the present invention.

An electric type compressor for a vehicle air conditioning apparatus according to a first preferred embodiment of the present invention will now be described with reference to FIGS. 1 and 2. In FIG. 1, a left side of the FIG. 1 is a front side of the compressor, and a right side thereof is a rear side of the compressor.

To begin with, the outline of the electric type compressor is described. As shown in FIG. 1, a first housing component 11a is fixedly joined to a second housing component 11b to form the configuration of the compressor or a compressor housing 11. Thereby, an enclosed space 30 is defined in the compressor housing 11. The first housing component 11a has a cylindrical circumferential wall 25 and a bottom at the rear side. The first housing component 11a is manufactured by die casting of aluminum. In the first embodiment, the aluminum includes aluminum alloy. Also, the second housing component 11b is in a cylindrical shape and has a cover at the front side. The second housing component 11b is also manufactured by die casting of the aluminum.

The compressor housing 11, which is made of the aluminum, is more lightweight than a compressor housing made of iron. The electric type compressor provided with the compressor housing 11 is suitable especially for being installed on vehicles in order to improve fuel efficiency.

Also, since the first and second housing components 11a and 11b are each manufactured by die casting, in comparison to the first and second housing components 11a and 11b manufactured by press work, the compressor housing 11 has a large degree of freedom in forming a certain shape. Therefore, a pin for installing the electric type compressor on the vehicle, which is not shown in the drawings, is easily integrally formed with the compressor housing 11. That is, the first housing component 11a and/or the second housing component 11b integrally form the pin. In this case, the number of parts of the electric type compressor is reduced.

In the enclosed space 30, a front space 30a and a rear space 30b are defined at the opposite sides of the stator 12 in the direction of the axis L of the stator 12. That is, the front space 30a is defined between the stator 12 and the compression mechanism C, which is located at the front side of the stator 12. Also, the rear space 30b is defined at the rear side of the stator 12. An inlet 18 is formed through the first housing component 11a so as to be connected to the rear space 30b. The inlet 18 is also connected to a piping in an external refrigerant circuit or an external piping 24. The inlet 18 serves as a mouth of the electric type compressor.

In the enclosed space 30 of the compressor housing 11, an electric motor M and a compression mechanism C are accommodated. The electric motor M is a DC brushless motor and includes a stator 12 and a rotor 14. The stator 12 is fixed on the inner circumferential surface 25a of the circumferential wall 25 in the first housing component 11a. The rotor 14 is installed on the rotary shaft 13 so as to be surrounded by the stator 12. When electric power is supplied to a coil 15 of the stator 12, the electric motor M rotates the rotary shaft 13.

In the enclosed space 30, a front space 30a and a rear space 30b are defined at the opposite sides in the direction of the axis L of the stator 12. That is, the front space 30a is defined between the stator 12 and the compression mechanism C, which is located at the front side of the stator 12. Also, the rear space 30b is defined at the rear side of the stator 12. An inlet 18 is formed through the first housing component Ha so as to correspond to the rear space 30b. The inlet 18 is connected to a piping in an external refrigerant circuit, that is, an external piping 24. The inlet 18 serves as a mouth of the electric type compressor.

The compression mechanism C is a scroll type and includes a fixed scroll 20 and a movable scroll 21. The movable scroll 21 is connected to the rotary shaft 13. The movable scroll 21 orbits relative to the fixed scroll 20 in accordance with the rotation of the rotary shaft 13 to compress a refrigerant gas. Therefore, when the compression mechanism C is activated by driving the electric motor M, the refrigerant gas at a relatively low temperature and pressure is drawn from the external refrigerant circuit to the compression mechanism C though the inlet 18, the rear space 30b, the electric motor M and the front space 30a. The temperature and pressure of the refrigerant gas after drawn into the compression mechanism C become relatively high by the compression of the compression mechanism C. The refrigerant gas at a relatively high temperature and pressure is discharged from an outlet 19, which is formed through the second housing component 11b, to the external refrigerant circuit.

Furthermore, the refrigerant gas is circulated through the electric motor M between the external refrigerant circuit and the compression mechanism C. Therefore, the electric motor M could be cooled by utilizing the refrigerant gas. Because the refrigerant gas having a relatively low pressure in a refrigerating cycle, is circulated through the electric motor M, the electric motor M is effectively cooled.

Now, the structure and the operation of the electric motor M will be described. Referring to FIGS. 1 and 2, the stator 12 of the electric motor M includes the coil 15 and a stator core 16 around which the coil 15 is wound. The stator core 16 is formed by layering a plurality of silicone steel plates, which is formed by press work, in the direction of the axis L. In other words, a thermal expansion coefficient of the stator core 16 is different from that of the compressor housing 11, which also serves as a housing of the electric motor M. Note that the thermal expansion coefficient of aluminum is larger than that of silicone steel. The stator core 16 includes a circular back yoke 16a whose center is located on the axis L. The stator core 16 also includes a plurality of teeth 16b that extends from the inner circumferential surface of the back yoke 16a inward. In the present embodiment, the number of the teeth 16b is six. In the stator core 16, the coil 15 is intensively wound around the teeth 16b.

The stator 12 is placed in the first housing component 11a by tightly fitting the stator core 16 to the inner circumferential surface 25a of the circumferential wall 25 of the first housing component 11a. The stator 12 is positioned to the first housing component 11a by contacting the rear end surface of the stator core 16 with a step 25b formed at the rear side of the inner circumferential surface 25a of the circumferential wall 25.

In the present embodiment, the stator 12 is tightly fitted to the circumferential wall 25 by shrink fit and press fit. Therefore, for example, since the inner circumferential surface 25a of the circumferential wall 25 and an outer circumferential surface 16c of the stator core 16 contact each other in a circular region or in circumference and the thermal expansion coefficient of the circumferential wall 25 is different from that of the stator core 16, a degree of tightness in the stator core 16 that is tightened by the circumferential wall 25 depends on a temperature change of the electric type compressor. The interference between the circumferential wall 25 and the stator core 16 is predetermined in such a manner that the circumferential wall 25 and the stator core 16 are not loose with each other even when the temperature of the electric type compressor becomes relatively high. Therefore, on the contrary, when the temperature of the electric type compressor becomes relatively low, the degree of tightness is excessively increased. Thereby, the circumferential wall 25 and/or the stator core 16 may generate a crack.

In the present embodiment, the electric type compressor is structured as follows that the circumferential wall 25 does not become excessively tight fit around the stator core 16 even when the temperature of the electric type compressor becomes relatively low.

Figure 2:
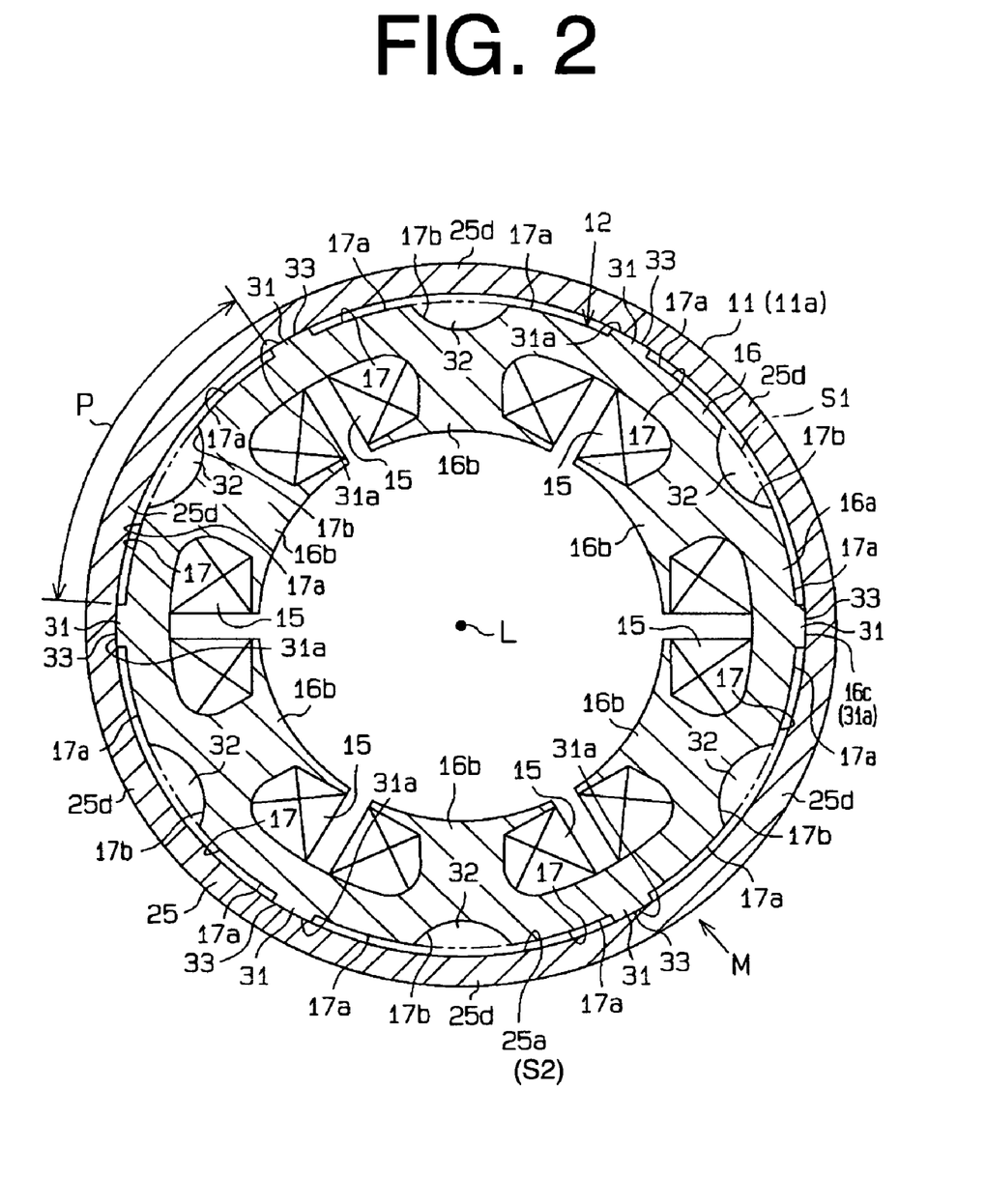
FIG. 2 is a cross sectional view taken along line I—I of FIG. 1, a rotor and a rotary shaft being removed from the cross sectional view.

As shown in FIGS. 1 and 2, a void 32 is defined between the inner circumferential surface 25a of the circumferential wall 25 and the outer circumferential surface 16c of the stator core 16, which are pressed against each other by the tight fit so as to prevent the both circumferential surfaces 25a and 16c from contacting each other in the circular region, whose center is located on the axis L. Also, the void 32 extends along the direction of the axis L and interconnects the front space 30a with the rear space 30b in the enclosed space 30. The void 32 serves as a part of a suction gas passage.

As shown in FIG. 2, the number of the voids 32 is plural and a plurality of the voids 32 is formed around the axis L of the stator core 16. In the present embodiment, the number of the voids 32 is six. Each void 32 is provided by forming a recess 17 in the outer circumferential surface 16c of the stator core 16. That is, each void 32 is a space formed between the associated recess 17 and the circumferential wall 25. A plurality of protrusions 31 remains in the outer circumferential surface 16c of the stator core 16 by forming a plurality of recesses adjacent to the protrusions 31 in the outer circumferential surface 16c.

In the outer circumferential surface 16c of the stator core 16, a distal end surface 31a of each protrusion 31, which is an arched convex surface, contacts a contact region of the inner circumferential surface 25a of the circumferential wall 25. A contacting portion 33 includes the distal end surface 31a and the contact region of the inner circumferential surface 25a.

The plurality of protrusions 31 is arranged at intervals of an equal angle around the axis L. Therefore, the number of the contacting portions 33 is plural and a plurality of the contacting portions 33 is arranged at intervals of an equal angle around the axis L of the stator core 16. In the present embodiment, the number of the contacting portions 33 is six. Therefore, pitch P between the contacting portions 33, which are located next to each other, are the same in every part around the axis L. That is, the plurality of voids 32 is formed in such a manner that the contacting portions 33 between the circumferential wall 25 and the stator core 16 are arranged at intervals of an equal angle around the axis L of the stator core 16.

Each recess 17 has a bottom surface in an arched shape. A region 17a is located at the opposite sides of the protrusion 31 along the bottom surface in a circumferential direction of the stator core 16. In other words, the region 17a adjoins the protrusion 31 of the stator core 16 and exists in a first imaginary cylindrical surface S1, whose center is located on the axis L of the stator core 16. In the middle of the bottom surface of each recess 17 in the circumferential direction of the stator core 16, a thinned portion 17b is formed in the shape of a concave surface so as to cave the first imaginary cylindrical surface S1.

The thinned portion 17b is located near the proximal end of the teeth 16b where a magnetic flux density is relatively lowered in the stator core 16. The object of the thinned portion 17b is mainly to reduce the weight of the stator core 16. However, since the thinned portion 17b is formed in the bottom surface of the recess 17, a cross sectional area of the void 32 in a perpendicular plane to the axis L, through which suction refrigerant gas passes, is also increased. Therefore, efficiency of intake of the compression mechanism C and cooling efficiency of the electric motor M are improved.

As described above, the inner circumferential surface 25a of the circumferential wall 25 contacts the outer circumferential surface 16c of the stator core 16 in the contact region. That is, the inner circumferential surface 25a of the circumferential wall 25 contacts the distal end surface 31a of the protrusion 31 in the contacting portion 33. The contact region exists in a second imaginary cylindrical surface S2, whose center is also located on the axis L. The second imaginary cylindrical surface S2 has the same length as the stator core 16 in the direction of the axis L. The radial differential between the second imaginary cylindrical surface S2 and the first imaginary cylindrical surface S1, that is, the height of the protrusion 31 that protrudes from the first imaginary cylindrical surface S1, is predetermined in such a manner that a ratio of the radial differential to the radius of the second imaginary cylindrical surface S2 is approximately 5/1000 to 15/1000. The electric type compressor according to the present embodiment is set in such a manner that the radius of the second imaginary cylindrical surface S2 is approximately 50 mm. Therefore, the height of the protrusion 31 is approximately 0.25 mm to 0.75 mm. Note that the height of the protrusion 31 is exaggeratedly shown in FIGS. 1 and 2.

In the second imaginary cylindrical surface S2, the inner circumferential surface 25a of the circumferential wall 25 and the outer circumferential surface 16c of the stator core 16 contact each other in the contact region, which has a first predetermined area. Also, the inner circumferential surface 25a of the circumferential wall 25 and the outer circumferential surface 16c of the stator core 16 do not contact each other in a non-contact region, which has a second predetermined area. The void 32 is formed in such a manner that the first predetermined area becomes smaller than the second predetermined area. In the present embodiment, specifically, in the second imaginary cylindrical surface S2, a ratio of the first predetermined area to the total area of the first predetermined area and the second predetermined area is 30% or less than 30%.

According to the first preferred embodiment of the present invention, the following effects are obtained.

(1) The void 32 is defined between the inner circumferential surface 25a of the circumferential wall 25 of the first housing component 11a and the outer circumferential surface 16c of the stator core 16 so as to prevent both circumferential surfaces 25a and 16c from contacting with each other in the circular region. Therefore, when the temperature of the electric type compressor becomes relatively low, if the circumferential wall 25 is made of aluminum and the stator core 16 is made of silicone steel shrink so as to tightly fit each other due to the difference in thermal expansion coefficient between the circumferential wall 25 and the stator core 16, an elastic part 25d of the circumferential wall 25 which is located near the void 32 is elastically deformed toward the void 32 like a leaf spring. The elastic part 25d has a curved tabular shape. The elastic deformation of the elastic part 25d absorbs the difference in shrinkage between the circumferential wall 25 and the stator core 16, thereby preventing the circumferential wall 25 from excessively tightly fitting the stator core 16. Thus, the generation of the crack of the circumferential wall 25 and/or the stator core 16 is prevented. As a result, the durability of the electric type compressor is improved.

(2) A plurality of the voids 32 is provided around the axis L of the stator core 16. That is, in the circumferential wall 25 of the compressor housing 11, a plurality of the elastic parts 25d is arranged around the axis L of the stator core 16. Therefore, when the temperature of the electric type compressor becomes relatively low, if the circumferential wall 25 and the stator core 16 shrink so as to tightly fit each other, the circumferential wall 25 is elastically deformed equally at each of the elastic parts 25d. Therefore, for example, in comparison with a case that the number of the voids 32 is only one, namely, a case that the circumferential wall 25 is intensively but elastically deformed at one elastic part 25d, a plurality of the voids 32 securely prevents the circumferential wall 25 from excessively tight fitting the stator core 16. Furthermore, damage is also prevented from being made to the circumferential wall 25 or the compressor housing 11, which is caused by the excessive deformation of a part of the circumferential wall 25 or one elastic part 25d.

(3) The number of the voids 32, which is provided around the axis L of the stator core 16, is three or more than three. That is, the circumferential walls 25 of the compressor housing 11 and the stator core 16 are contacted with each other around the axis L of the stator core 16 at at least three spots. Therefore, the number of the contacting portions 33, where the stator core 16 is supported by the circumferential wall 25, is at least three, and such contacting portions 33 are arranged around the axis L of the stator core 16. Since the stator core 16 is supported by the circumferential wall 25 at at least three spots, for example, in comparison to two of the voids 32 with two of the contacting portions 33 between the circumferential wall 25 and the stator core 16 around the axis L, the stator core 16 is more steadily supported by the circumferential wall 25.

Accordingly, when the electric type compressor is manufactured, the axis L is easily conformed for the stator core 16 and the circumferential wall 25. For example, when the rotary shaft 13 is installed in the compressor housing 11 through the front bearing 22 and the rear bearing 23, the rotor 14, which is installed on the rotary shaft 13, is hardly interfered with the stator core 16. Thus, the electric type compressor is easily manufactured.

(4) The contacting portions 33 between the circumferential wall 25 of the compressor housing 11 and the stator core 16 are arranged at intervals of an equal angle around the axis L. Therefore, in comparison with a case that the contacting portions 33 are arranged at intervals of an unequal angle around the axis L, the stator core 16 is more steadily supported by the circumferential wall 25. Furthermore, even if the circumferential wall 25 and the stator core 16 shrink so as to tightly fit each other due to a thermal effect, each elastic part 25*d* is equally and elastically deformed. Thereby, damage to the circumferential wall 25, which is caused by the excessive deformation of a part of the elastic parts 25*d* or one elastic part 25*d*, is securely prevented.

(5) The void 32 is provided by forming the recess 17 in the outer circumferential surface 16*c* of the stator core 16. Therefore, if the first embodiment of the present invention is to be applied to a prior art electric type compressor, the void 32 is simply formed by changing a part of the shape of an existing press die for manufacturing a stator core.

(6) The height of the protrusion 31 that extends from the first imaginary cylindrical surface S1 is determined in such a manner that a ratio of the height of the protrusion 31 to the radius of the second imaginary cylindrical surface S2 is approximately $5/1000$ to $15/1000$. Therefore, the increased size of the electric type compressor and the deteriorated efficiency of the electric motor M are prevented. In addition, in the circumferential wall 25, the elastic part 25*d* is securely elastically deformed. Thus, the prevention is compatible with the elastic deformation at a relatively high level.

In other words, in order to prevent the deterioration of the efficiency of the electric motor M and the increase of the diameter of the stator core 16, which increases the size of the electric type compressor, a radial differential needs to be reduced between the second imaginary cylindrical surface S2 and the first imaginary cylindrical surface S1. Since the depth of the recess 17 is a cause of magnetic saturation, the depth needs to be reduced. Specifically, the depth of the recess 17 other than the thinned portion 17*b*, or the depth of the region 17*a*, needs to be reduced. On the other hand, in order to securely and elastically deform the elastic part 25*d* of the circumferential wall 25, the radial differential or the height of the protrusion 31 that protrudes from the first imaginary cylindrical surface S1 requires increasing. Thereby, a space for permitting the elastic deformation of the circumferential wall 25 requires to secure a predetermined volume. In other words, the depth of the recess 17 requires to secure a predetermined length. To fulfill the suitable balance in the depth of the recess 17, as described above, the ratio of the height of the protrusion 31 to the radius of the second imaginary cylindrical surface S2 is preferably approximately in a range of $5/1000$ to $15/1000$ or 0.5 to 1.5%.

(7) In the second imaginary cylindrical surface S2, as descried above, the contact region where the inner circumferential surface 25*a* of the circumferential wall 25 contacts the outer circumferential surface 16*c* of the stator core 16 has the first predetermined area. Also, the non-contact region where the inner circumferential surface 25*a* of the circumferential wall 25 does not contact the outer circumferential surface 16*c* of the stator core 16 has the second predetermined area. The void 32 is formed between the inner circumferential surface 25*a* of the circumferential wall 25 and the outer circumferential surface 16*c* of the stator core 16 in such a manner that the first predetermined area becomes smaller than the second predetermined area. Thus, since the first predetermined area of the contact region is set to be relatively small, in the circumferential wall 25, the elastic part 25*d* is secured in a relatively large region of the circumferential wall 25. Therefore, the elastic deformation of the elastic part 25*d* is effectively performed. Thereby, excessively tightening the stator core 16 is securely prevented. As a result, inconvenience such as a crack is securely prevented. Specifically, on the second imaginary cylindrical surface S2, the ratio of the first predetermined area to the total area of the first predetermined area and the second predetermined area is set to be 30% or less than 30% in order to securely prevent the circumferential wall 25 from excessively tightening the stator core 16.

(8) The inlet 18 and the compression mechanism C are in communication with a suction refrigerant gas passage. The void 32 forms a part of the suction refrigerant gas passage. Therefore, the electric motor M is effectively cooled by suction refrigerant gas at a relatively low temperature, which passes through the void 32. Thereby, the deterioration in efficiency of the electric type compressor is prevented from raising the temperature of the electric motor M.

(9) The void 32 serves as a part of the suction refrigerant gas passage mainly in the thinned portion 17*b* formed in the stator core 16, which occupies a relatively large part of the cross sectional area of the void 32. If the void 32 is provided by forming a recess only at the side of the inner circumferential surface 25*a* of the circumferential wall 25, the diameter of the circumferential wall 25 needs to be increased in order to secure the cross sectional area for passing the refrigerant gas, which corresponds to the thinned portion 17*b*. Thereby, the size of the electric type compressor is also increased.

However, in the present embodiment where the void 32 is provided by forming the recess 17 in the outer circumferential surface 16*c* of the stator core 16, the thinned portion 17*b* is formed so as to correspond to the teeth 16*b* of the stator core 16. In other words, the thinned portion 17*b* is formed so as not to generate the magnetic saturation. Thereby, the thinned portion 17*b* does not increase the diameter of the stator core 16. Namely, the size of the electric type compressor is not increased. Meanwhile, since the stator core 16 is structured in such a manner that the coil 15 is intensively wound around the teeth 16*b*, even if the thinned portion 17*b* is formed so as to correspond to the teeth 16*b* of the stator core 16, the magnetic saturation is not generated. However, if the stator core 16 is structured in such a manner that the coil 15 is distributively wound around the teeth 16b, the magnetic saturation may be generated by forming the thinned portion 17b in the stator core 16. Therefore, in order to prevent the generation of the magnetic saturation, the diameter of the stator core 16 needs to be increased by a radial length of the thinned portion 17b.

That is, in the electric type compressor provided with the electric motor M where the coil 15 is intensively wound around the teeth 16b, the void 32 is provided by forming the recess 17 in the outer circumferential surface 16c of the stator core 16. Thereby, the void 32 also serves as a part of the suction refrigerant gas passage without increasing the size of the electric type compressor.

Figure 3:
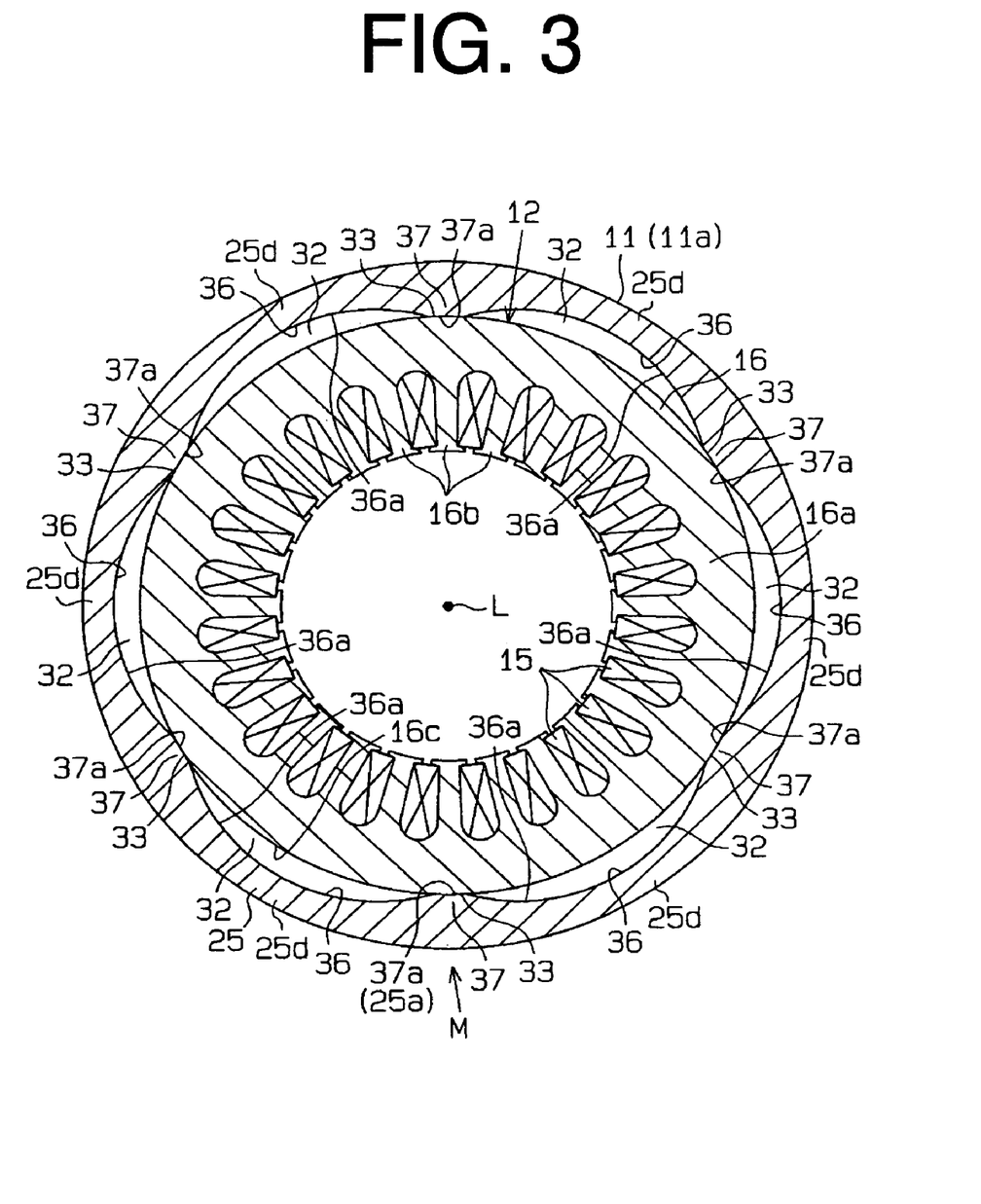
FIG. 3 is a cross sectional view illustrating an electric type compressor according to a second preferred embodiment of the present invention, a rotor and a rotary shaft being removed from the cross sectional view.

An electric type compressor for a vehicle air conditioning apparatus according to a second preferred embodiment of the present invention will now be described with reference to FIG. 3. In the second embodiment, only different aspects from the first embodiment are described. Identical reference numerals to the first embodiment are applied to substantially the same members in the second embodiment, and the overlapping description is omitted. In the second embodiment, in comparison with the first embodiment, the teeth 16b of the stator core 16 of the electric motor M are relatively compact and the number of the teeth 16b is increased. Specifically, in the present embodiment, the number of the teeth 16b is twenty four. In the present embodiment, the stator core 16 is structured in such a manner that the coil 15 is distributively wound around the teeth 16b of the stator core 16. Such structured electric motor M that the coil 15 is distributively wound around the teeth 16b is more noiseless than the electric motor M, where the coil 15 is intensively wound around the teeth 16b.

Also, in the present embodiment, the void 32 is provided not by forming a recess 36 in the outer circumferential surface 16c of the stator core 16 but by forming the recess 36 in the inner circumferential surface 25a of the circumferential wall 25. The number of the recesses 36 is plural, and the recesses 36 are formed around the axis L at intervals of an equal angle. In the present embodiment, the number of the recesses 36 is six. Each recess 36 extends along the direction of the axis L in the enclosed space 30 of the compressor housing 11 and is formed so as to become larger than the total length in the direction of the axis L of the stator core 16. Thereby, the recess 36 interconnects the front space 30a with the rear space 30b.

A plurality of protrusions 37 remains in the inner circumferential surface 25a of the circumferential wall 25 after forming a plurality of the recesses 36 in the inner circumferential surface 25a. A distal end surface 37a of each protrusion 37, which is in the shape of an arched concave surface, is contacted with a cylindrical outer surface of the stator core 16 or the outer circumferential surface 16c in a contact region. The contacting portion 33 includes the distal end surface 37a and the contact region of the outer circumferential surface 16c. A bottom surface 36a of each recess 36 is as a whole in the shape of a curved concave surface. Therefore, the inner circumferential surface 25a of the circumferential wall 25 is a waveform in the circumferential direction of the stator core 16, and the elastic part 25d of the circumferential wall 25 is thinner than other parts of the circumferential wall 25, which correspond to the contacting portion 33.

In the second embodiment, the above-described effects (1)~(4), (7), and (8) are substantially obtained. In addition, the following effects are also obtained.

(10) The void 32 is provided by forming the recess 36 in the inner circumferential surface 25a of the circumferential wall 25 of the first housing component 11a. Therefore, when the present embodiment is applied to prior art electric type compressors, the void 32 is simply provided by changing a part of the shape of an existing die for manufacturing the first housing component 11a.

(11) In the present embodiment where the stator core 16 is structured in such a manner that the coil 15 is distributively wound around the teeth 16b, if a recess similar to the recess 17 of the first embodiment is formed in the outer circumferential surface 16c of the stator core 16, the magnetic saturation may be generated. Therefore, in order to prevent the generation of the magnetic saturation, the diameter of the stator core 16 is required to increase by the length of the recess 17 in the radial direction of the stator core 16 or the depth of the recess 17. In the present embodiment, however, since the void 32 is provided by forming the recess 36 in the inner circumferential surface 25a of the circumferential wall 25, for example, in comparison to the void 32 by forming the recess 17 in the outer circumferential surface 16c of the stator core 16, the diameter of the stator core 16 is more reduced. That is, the size of the electric motor M is also reduced.

Figure 4:
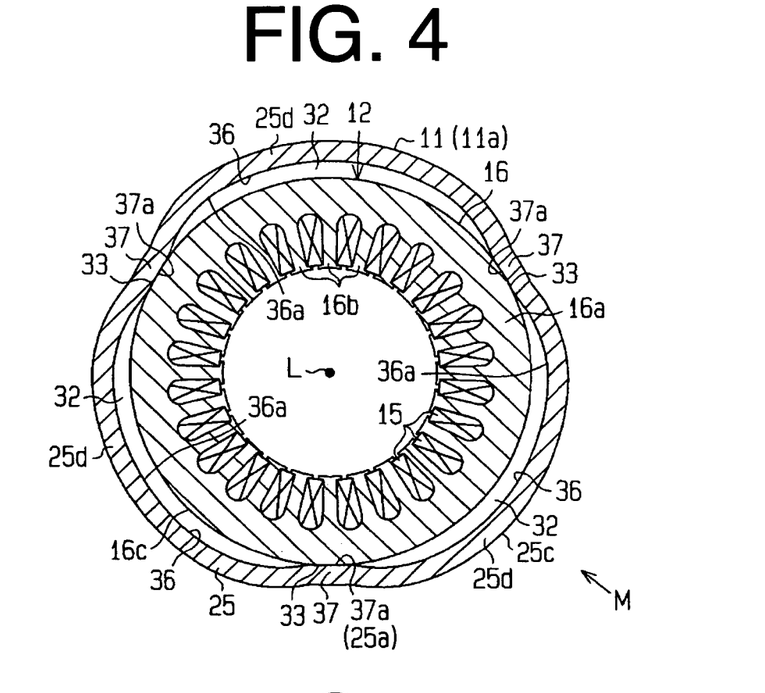
FIG. 4 is a cross sectional view illustrating an electric type compressor according to a third preferred embodiment of the present invention, a rotor and a rotary shaft being removed from the cross sectional view.

An electric type compressor for a vehicle air conditioning apparatus according to a third preferred embodiment of the present invention will now be described with reference to FIG. 4. In the third embodiment, only aspects different from the second embodiment are described. Identical reference numerals to the second embodiment are applied to substantially the same members in the third embodiment, and overlapping description is omitted. In the present embodiment, the number of the voids 32 around the axis L, is three. That is, the circumferential wall 25 of the compressor housing 11 and the stator core 16 are contacted with each other at three spots around the axis L of the stator core 16. Therefore, there are the three contacting portions 33 where the stator core 16 is supported by the circumferential wall 25 around the axis L of the stator core 16.

In the present embodiment, the recess 36, which is formed in the inner circumferential surface 25a of the circumferential wall 25, is formed by expanding the elastic part 25d outwardly in the radial direction of the circumferential wall 25. Therefore, an outer circumferential surface 25c of the circumferential wall 25 has a wave form in the circumferential direction of the stator core 16 that is similar to the inner circumferential surface 25a, but is different from an outer circumferential surface of the circumferential wall 25 of the above-described second embodiment, which forms a circumferential surface. That is, the circumferential wall 25 has a wave form in the circumferential direction of the stator core 16 so as to maintain a substantially uniform thickness. The thickness of the part of the circumferential wall 25, which corresponds to the contacting portion 33, is equal to the thickness of the elastic part 25d.

Figure 5:
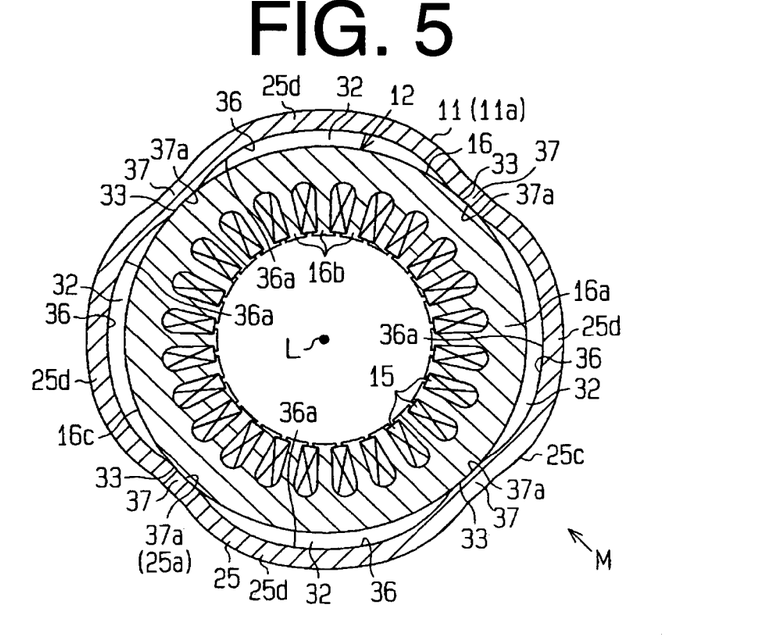
FIG. 5 is a cross sectional view illustrating an electric type compressor according to a fourth preferred embodiment of the present invention, a rotor and a rotary shaft being removed from the cross sectional view.

An electric type compressor for a vehicle air conditioning apparatus according to a fourth preferred embodiment of the present invention will now be described with reference to FIG. 5. In the fourth embodiment, only aspects different from the third embodiment are described. Identical reference numerals to the third embodiment are applied to substantially the same members in the fourth embodiment, and overlapping description is omitted. In the present embodiment, the number of the voids 32, which are provided around the axis L, is four. That is, the circumferential wall 25 of the compressor housing 11 and the stator core 16 contact with each other at four spots around the axis L of the stator core 16. Therefore, there are four contacting portions 33 where the stator core 16 is supported by the circumferential wall 25 around the axis L of the stator core 16.

Figure 6:
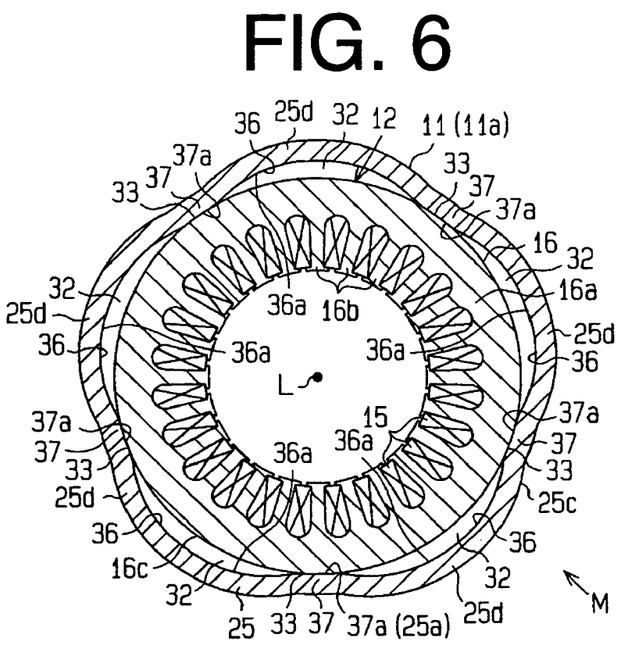
FIG. 6 is a cross sectional view illustrating an electric type compressor according to a fifth preferred embodiment of the present invention, a rotor and a rotary shaft being removed from the cross sectional view.

An electric type compressor for a vehicle air conditioning apparatus according to a fifth preferred embodiment of the present invention will now be described with reference to FIG. 6. In the fifth embodiment, only aspects different from the third embodiment are described. Identical reference numerals to the third embodiment are applied to substantially the same in the fifth embodiment, and overlapping description is omitted.

In the present embodiment, the number of the voids 32, which are provided around the axis L, is five. That is, the circumferential wall 25 of the compressor housing 11 and the stator core 16 contact with each other at five spots around the axis L of the stator core 16. Therefore, there are five contacting portions 33 where the stator core 16 is supported by the circumferential wall 25 around the axis L of the stator core 16.

In the third, fourth and fifth embodiments, the above-described effects (1)~(4), (7), (8), (10), (11) are substantially obtained. In addition, the following effects are also obtained.

(12) The recess 36 of the inner circumferential surface 25a of the circumferential wall 25 is formed by expanding the elastic part 25d of the circumferential wall 25 outwardly in the radial direction of the stator core 16. Therefore, the circumferential wall 25 is formed in the shape of a wave in the circumferential direction of the stator core 16 so as to maintain a substantially uniform thickness by the outward expansion of the elastic part 25d in the radial direction of the stator core 16. Thereby, for example, in comparison to second preferred embodiment having the recess 36 formed in the inner circumferential surface 25a of the circumferential wall 25 whose elastic part 25d becomes thinner than the part of the circumferential wall 25, which corresponds to the contacting portion 33, rigidity of the circumferential wall 25 and of the first housing component 11a is enhanced. Thus, durability of the electric type compressor is improved.

(13) In the circumferential wall 25, the number of spots where the elastic part 25d is expanded outwardly in the radial direction of the stator core 16 around the axis L is five or less than five. Therefore, even if the circumferential wall 25 and the stator core 16 shrink to tightly fit each other due to thermal effects, such a small number of spots prevents the circumferential wall 25 from excessively tight fitting the stator core 16.

That is, when the circumferential wall 25 is expanded outwardly, in comparison with a preferred embodiment having the circumferential wall 25 that is not expanded outwardly, the rigidity of the circumferential wall 25 is lowered. Besides, for example, if the number of spots where the elastic parts 25d or the voids 32 is provided around the axis L of the stator core 16 is at least six, and if the corresponding plurality of elastic parts 25d is respectively expanded outwardly in the radial direction of the stator core 16, the rigidity of the circumferential wall 25 is excessively enhanced. At this time, each elastic part 25d is hardly deformed in an elastic manner. Therefore, if the circumferential wall 25 and the stator core 16 shrink to tight fit each other due to thermal effects, the circumferential wall 25 excessively tightly fit the stator core 16 because of such a great number of spots.

An electric type compressor for a vehicle air conditioning apparatus according to a sixth preferred embodiment of the present invention will now be described with reference to FIG. 7. In the sixth embodiment, only aspects different from the fourth embodiment are described. Identical reference numerals to the fourth embodiment are applied to substantially the same members in the sixth embodiment, and overlapping description is omitted. Note that in the fourth embodiment the number of voids 32 is four.

In the present embodiment, a first void element 32a is provided between the circumferential wall 25 and the stator core 16 by forming the recess 36 in the inner circumferential surface 25a of the circumferential wall 25. The recess 36 is formed by outwardly expanding a part of the elastic part 25d of the circumferential wall 25, which corresponds to the recess 36, in the radial direction of the stator core 16. A second void element 32b is also provided between the circumferential wall 25 and the stator core 16 by forming the recess 17 in the outer circumferential surface 16c of the stator core 16. Note that in the present embodiment, the thinned portion 17b of the first embodiment, which is shown in FIG. 2, is eliminated from the recess 17.

The recess 17 of the stator core 16 is set to be longer in the circumferential direction of the stator core 16 than the recess 36 of the circumferential wall 25. The recess 36 is arranged in such a manner that an opening of the recess 36 faces a part of the recess 17. Therefore, the first void element 32a, which is provided by the recess 36, is connected to the second void element 32b so as to expand a part of the second void element 32b, which is provided by the recess 17, outwardly in the radial direction of the stator core 16. That is, the void 32 includes the first void element 32a and the second void element 32b.

Figure 7:
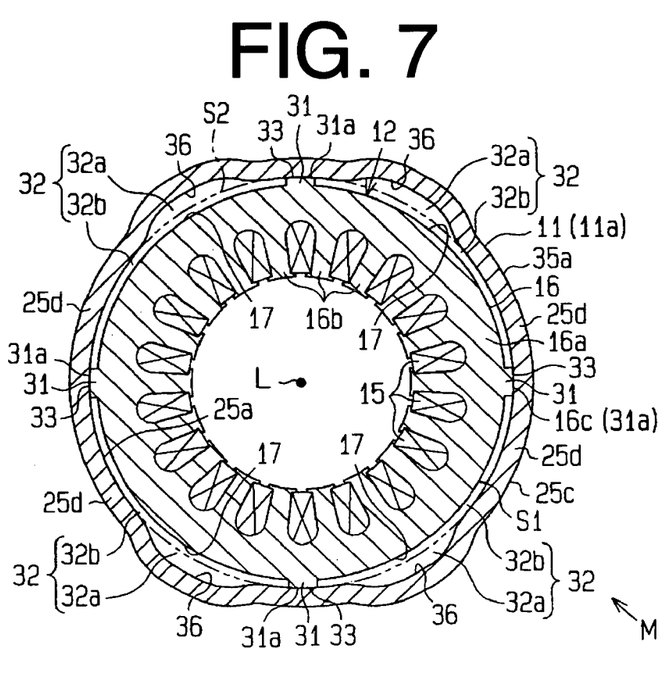
FIG. 7 is a cross sectional view illustrating an electric type compressor according to a sixth preferred embodiment of the present invention, a rotor and a rotary shaft being removed from the cross sectional view.

As shown in FIG. 7, each void 32 adjoins two of the voids 32. Each void 32 is provided in such a manner that the void 32 and one adjacent of the voids 32 are approached to each other between the respective first void elements 32a. Therefore, each void 32 is provided in such a manner that the void 32 and the adjacent void 32, are kept from each other by a relatively large distance in the circumferential direction of the stator core 16 between the first void elements 32a. Thereby, in the waved-shape of the circumferential wall 25 in the circumferential direction of the stator core 16, which is formed by the outward expansion of a plurality of the elastic parts 25d, a vertex of each wave is arranged at intervals of an unequal angle around the axis L.

In the present embodiment, the above-described effects (1)~(8), (10), (12), (13) are substantially obtained. In addition, the following effects are also obtained.

(14) Each void 32 includes the first void element 32a, which is provided by the recess 36 formed by expanding the part of the elastic part 25d outwardly in the radial direction of the stator core 16, and the second void element 32b, which is provided by forming the recess 17 in the outer circumferential surface 16c of the stator 16. Therefore, in order to fulfill a predetermined property of an elastic deformation of the elastic part 25d, the elastic part 25d as a whole does not require outward expansion in the radial direction of the stator core 16. Thereby, for example, a demand is fulfilled for suppressing unevenness of a configuration of the electric type compressor, and in particular for suppressing waves of the shape of the outer circumferential surface 25c of the circumferential wall 25. In addition, the partial expansion of the circumferential wall 25 prevents the rigidity of the circumferential wall 25 from excessively being reduced by the outward expansion of the circumferential wall 25. Furthermore, the predetermined property of the elastic deformation of the elastic part 25d is gained. Thus, appropriate tightening force is obtained.

Figure 8:
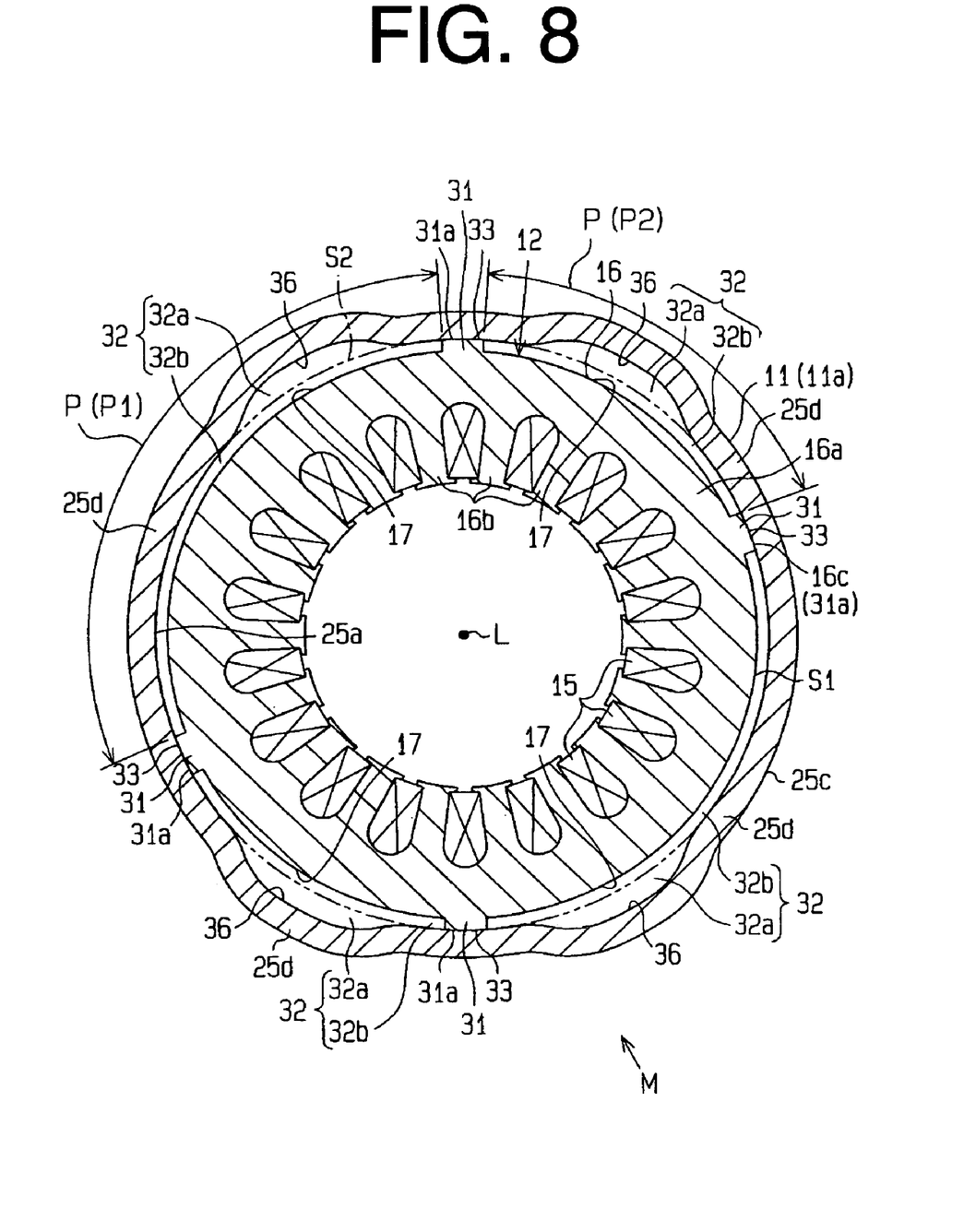
FIG. 8 is a cross sectional view illustrating an electric type compressor according to a seventh preferred embodiment of the present invention, a rotor and a rotary shaft being removed from the cross sectional view.

An electric type compressor for a vehicle air conditioning apparatus according to a seventh preferred embodiment of the present invention will now be described with reference to FIG. 8. In the seventh embodiment, only aspects different from the sixth embodiment are described. Identical reference numerals to the sixth embodiment are applied to substantially the same members in the seventh embodiment, and overlapping description is omitted.

In the present embodiment, a plurality of recesses 17 is set in such a manner that the length in the circumferential direction of some of the recesses 17 is smaller than that of other recesses 17. In FIG. 8, the number of the recesses 17, which is formed in the stator core 16, is four, and two of the four recesses 17 are smaller in length in the circumferential direction than two other recesses 17. Therefore, the protrusion 31 of the stator core 16 or the contacting portion 33 between the circumferential wall 25 and the stator core 16 is arranged at intervals of an unequal angle around the axis L. Thereby, adjacent pitches P between the contacting portions 33 are different from each other. In FIG. 8, pitches P1 are larger than pitches P2. In this case, in comparison with the elastic part 25d, whose pitch P1 between the contacting portions 33 is relatively large, it is more difficult for the elastic part 25d, whose pitch P2 between the contacting portions 33 is relatively small to elastically deform.

In the present embodiment, the above-described effects (1)~(3), (5)~(8), (10), (12)~(14) are substantially obtained. In addition, the following effects are also obtained.

(15) A plurality of the recesses 32 is set in such a manner that the plurality of contacting portions 33 between the circumferential wall 25 and the stator core 16 is arranged at intervals of an unequal angle around the axis L. Therefore, if the circumferential wall 25 and the stator core 16 shrink to tightly fit each other due to thermal effects, an amount of elastic deformation of the plurality of elastic parts 25d becomes also unequal. In this case, however, in the plurality of elastic parts 25d, some of the elastic parts 25d have different spring constant from other elastic parts 25d. Namely, some of the elastic parts 25d have a different natural frequency from other elastic parts 25d. Therefore, the difference between the natural frequencies of the elastic parts 25d prevents all the elastic parts 25d from simultaneously resonating due to the vibration of the stator core 16. Thereby, the generation of vibration and noise is reduced due to the resonance in the electric type compressor.

In the present invention, following alternative embodiments are also practiced. In the above-described embodiments, the compressor housing 11 or the circumferential wall 25 is made of the aluminum and the stator core 16 is made of silicone steel, whose thermal expansion coefficient is different from that of the aluminum. In alternative embodiments to the above-described embodiments, the compressor housing 11, whose thermal expansion coefficient is different from the stator core 16, is made of metallic material other than the aluminum. For example, the compressor housing 11 is made of resin material.

In the above-described embodiments, the thermal expansion coefficient of the compressor housing 11 or the circumferential wall 25 is differentiated from that of the stator core 16 in such a manner that when the temperature of the electric type compressor becomes relatively low, the compressor housing 11 and the stator core 16 shrink so as to tightly fit each other. That is, the thermal expansion coefficient of the compressor housing 11 is larger than that of the stator core 16. In alternative embodiments to the above-described embodiments, the thermal expansion coefficient of the compressor housing 11 is differentiated from that of the stator core 16 in such a manner that when the temperature of the electric type compressor becomes relatively high, the compressor housing 11 and the stator core 16 expand so as to tightly fit each other. That is, the compressor housing 11 is made of the material whose thermal expansion coefficient is smaller than that of the stator core 16.

In the first and second embodiments, the number of the voids 32 is six. In the third embodiment, the number of the voids 32 is three. In the fourth, sixth and seventh embodiments, the number of the voids 32 is four. In the fifth embodiment, the number of the voids 32 is five. However, the number of the voids 32 is not limited to three through six. In alternative embodiments to the above-described embodiments, the number of the voids 32 is one, two, seven or more than seven.

In the first embodiment through the fifth embodiment, a plurality of the voids 32 is provided in such a manner that the contacting portions 33 between the circumferential wall 25 and the stator core 16 are arranged at intervals of an equal angle around the axis L. In alternative embodiments to the first embodiment through the fifth embodiment, the plurality of voids 32 is provided in such a manner that the contacting portions 33 between the circumferential wall 25 and the stator core 16 are arranged at intervals of an unequal angle around the axis L. In this case, the above-described effect (15) is substantially obtained.

In the second embodiment through the seventh embodiment, the coil 15 is distributively wound around the teeth 16b. In alternative embodiments to the second embodiment through the seventh embodiment, the coil 15 is intensively wound around the teeth 16b.

In the sixth and seventh embodiments, the first void element 32a is provided by forming the recess 36 in the inner circumferential surface 25a of the circumferential wall 25, and the second void element 32b is provided by forming the recess 17 in the outer circumferential surface 16c of the stator core 16. The first and second void elements 32a and 32b are connected to each other in the radial direction of the stator core 16. Thereby, one void 32 is formed. In alternative embodiments to the sixth and seventh embodiments, however, the first void element 32a, is provided by forming the recess 36 in the inner circumferential surface 25a of the circumferential wall 25, and the second void element 32b, is provided by forming the recess 17 in the outer circumferential surface 16c of the stator core 16. The first and second void elements 32a and 32b are separated from each other in the radial direction of the stator core 16. Thereby, the first void element 32a and the second void element 32b are each individually formed. That is, in this case, the number of voids 32, which is provided around the axis L of the stator core 16, is eight.

In alternative embodiments to the above-described embodiments, the compression mechanism C is changed to a compression mechanism other than a scroll type. For example, the compression mechanism C is changed to a piston type, a vane type and a helical type.

The above-described embodiments of the present invention are applied to the electric type compressor, which serves as an electric machine, formed by integrating the electric motor with the compression mechanism C, which serves as a rotary machine. In alternative embodiments to the above-described embodiments, however, the present invention is merely applied to an electric motor.

Therefore, the present examples and embodiments are to be considered as illustrative and not restrictive, and the invention is not to be limited to the details given herein but may be modified within the scope of the appended claims.

What is claimed is:

1. An electric type compressor motor comprising:
a housing having an inner circumferential surface, the housing also having a first thermal expansion coefficient, the housing further having an elastic part and having a plurality of recesses which are formed near the elastic part extending outwardly in the radial direction of the inner circumferential surface to define corresponding first voids;
an electric motor including a circular stator core pressed to an inside of the housing by tight fit, the stator core having an outer circumferential surface and a central axis, the stator core also having a second thermal expansion coefficient that is different from the first thermal expansion coefficient;
a compressor mechanism accommodated in the housing and connected to the electric motor for compressing gas as driven by the electric motor;
wherein second voids are defined between the inner circumferential surface outside the recesses of the housing and the outer circumferential surface of the stator core so as to prevent the inner and the outer circumferential surfaces from contacting each other in a circular region, wherein the first voids and the second voids extend substantially along the length of the stator core in the direction of the central axis of the stator core and wherein one of the first voids and corresponding one of the second voids define a void,
wherein the elastic part of the housing is located near each of the first voids, and wherein the elastic part of the housing is elastically deformed when the housing and the stator core expand or shrink so as to tightly fit each other due to a differential between the first and the second thermal expansion coefficients.

2. The electric type compressor according to claim 1, wherein the first thermal expansion coefficient is larger than the second thermal expansion coefficient.

3. The electric type compressor according to claim 1, wherein the first thermal expansion coefficient is smaller than the second thermal expansion coefficient.

4. The electric type compressor according to claim 1, wherein the number of the first voids is three or more than three.

5. The electric type compressor according to claim 1, wherein the housing and the stator core have a plurality of contacting portions therebetween, the plurality of the second voids being provided in such a manner that the plurality of contacting portions are arranged at intervals of an equal angle around the axis.

6. The electric type compressor according to claim 1, wherein the housing and the stator core have a plurality of contacting portions therebetween, the plurality of the second voids being provided in such a manner that the plurality of contacting portions are arranged at intervals of an unequal angle around the axis.

7. The electric type compressor according to claim 1, wherein each of the recesses of the stator core has a bottom surface in which a region is located at the opposite sides in a circumferential direction of the stator core, at least the region existing in a first imaginary cylindrical surface, whose center is located on the axis, the inner circumferential surface and the outer circumferential surface being contacted with each other in a contact region, the contact region existing in a second imaginary cylindrical surface, whose center is also located on the axis, radial differential between the first and the second imaginary cylindrical surfaces being predetermined in such a manner that a ratio of the radial differential to the radius of the second imaginary cylindrical surface is approximately from 0.5 to 1.5%.

8. The electric type compressor according to claim 1, wherein the number of the elastic part is five or less than five around the axis of the stator core.

9. The electric type compressor according to claim 1, wherein each of the recesses of the housing has a bottom surface in the shape of a concave surface.

10. The electric type compressor according to claim 1, wherein the inner circumferential surface and outer circumferential surface being contacted with each other in a contact region, the contact region existing in an imaginary cylindrical surface, whose center is located on the axis, the contact region having a first predetermined area, the imaginary cylindrical surface having the same length as the stator core in the direction of the axis, the imaginary cylindrical surface also having a non-contact region where the inner circumferential surface and the outer circumferential surface do not contact each other, the non-contact region having a second predetermined area, the voids being formed in such a manner that the first predetermined area becomes smaller than the second predetermined area.

11. The electric type compressor according to claim 10, wherein a ratio of the first predetermined area to the total area of the first predetermined area and the second predetermined area is 30% or less than 30%.

12. The electric type compressor according to claim 1, further comprising a coil that is intensively wound around the stator core.

13. The electric type compressor according to claim 1, further comprising a coil that is distributively wound around the stator core.

14. The electric type compressor according to claim 1, wherein the housing is made of aluminum and/or aluminum alloy, the stator core being made of silicone steel.

15. The electric type compressor according to claim 1, wherein a first space and a second space are defined at opposite sides of the axis in the housing, the voids interconnecting the first space with the second space, the compression mechanism being placed at the first space side, a mouth of the electric type compressor, which is formed through the housing so as to correspond to the second space, being connected with an external piping, the voids being utilized as a gas passage that interconnects the compression mechanism with the mouth.

* * * * *